(No Model.)
A. H. TWOMBLY.
APPARATUS FOR RECOVERING SODA.
No. 585,604. Patented June 29, 1897.
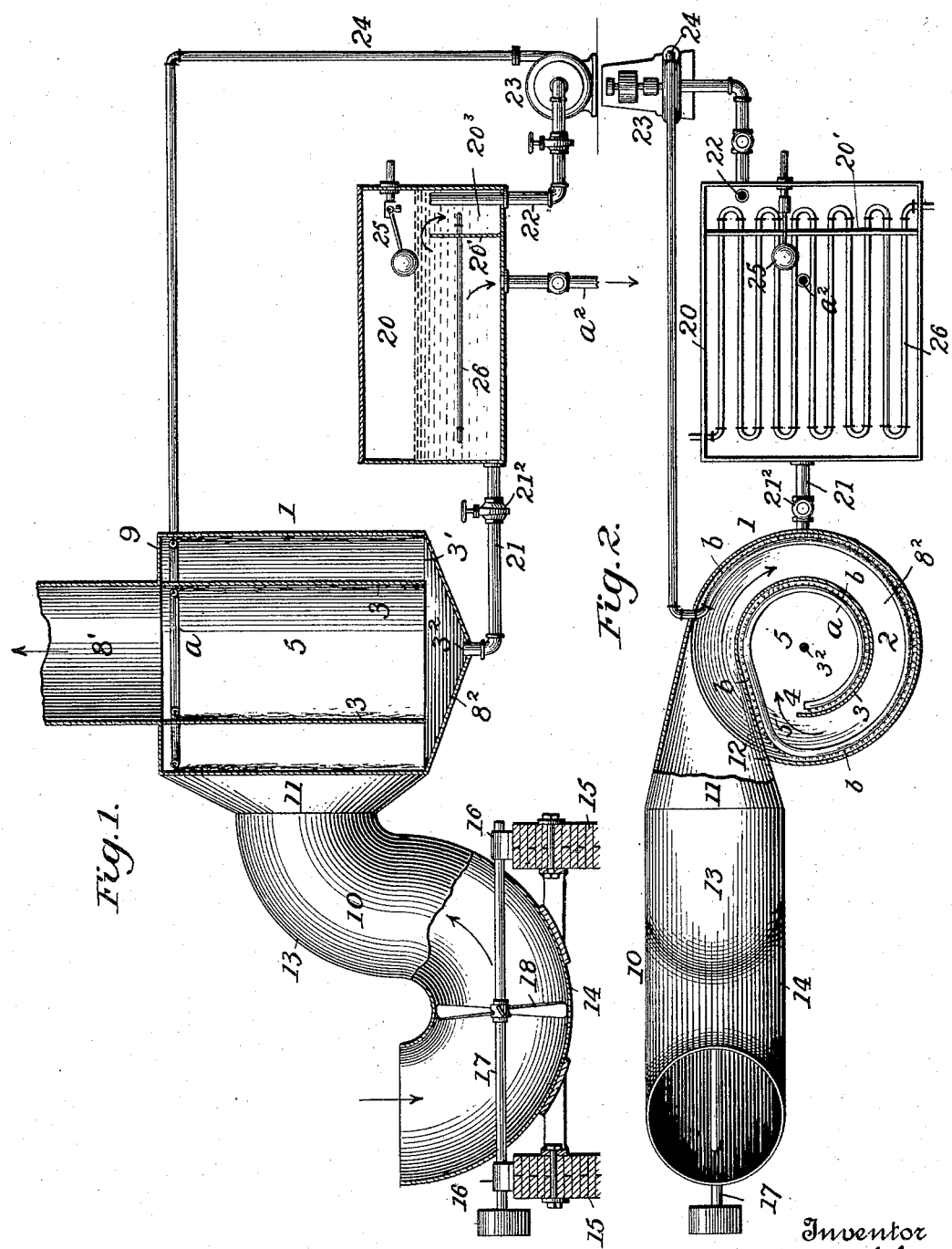
Witnesses
J. G. Hinkel
E. Everett Ellis
Inventor
Alex. H. Twombly
by Foster Freeman
Attorneys

UNITED STATES PATENT OFFICE.

ALEXANDER H. TWOMBLY, OF YARMOUTH, MAINE.

APPARATUS FOR RECOVERING SODA.

SPECIFICATION forming part of Letters Patent No. 585,604, dated June 29, 1897.

Application filed September 19, 1896. Serial No. 606,423. (No model.)

*To all whom it may concern:*

Be it known that I, ALEXANDER H. TWOMBLY, a citizen of the United States, residing at Yarmouth, in the county of Cumberland and State of Maine, have invented certain new and useful Improvements in Apparatus for Recovering Substances from Air or Gases, of which the following is a specification.

This invention relates to certain new and useful improvements in means for separating from air and gases substances held therein in suspension; and it consists, substantially, in such features of construction, arrangement, and combinations of parts as will hereinafter be more particularly described.

The object of the invention is the recovery of the waste in soda-ash and other chemical substances employed in the manufacture of different kinds of pulp and the like.

A further object is the provision of simple and effective apparatus for this purpose, substantially as will hereinafter more fully appear when taken in connection with the accompanying drawings, in which—

Figure 1 is a longitudinal sectional elevation of an apparatus constructed and arranged in accordance with my invention; and Fig. 2 is a top plan view, in part section, with the top of the tank removed.

In order to successfully carry my invention into effect, several main elements are essential thereto—such, for instance, as a separator, a storage-tank for water or other liquor, and means for causing a constant circulation of such liquor from the tank to the separator, through the latter, and back again to the tank. I am aware that some such arrangement has been heretofore proposed with reference to certain forms of washing or scrubbing devices for ordinary illuminating-gas, in which the gas is subjected to a spray of a continuously-circulating medium which passes down through the volume of gas to deprive the same of the impurities therein. With my invention to simply direct a spray of the separating liquor upon the ascending air or gas would be insufficient and practically ineffective, since the said air or gas when laden with soda-ash or other similar chemical substances must not have its volume broken up or disturbed, as would be the case with a spray, but the volume must be kept as nearly as possible *en masse* or intact. This I accomplish by directing the water or other liquor to flow down the inner sides of the separator in unbroken sheets, and the gas or air laden with the substance to be separated is made to impinge against the entire surface of the descending sheets of liquor, the latter both by its inherent quality as well as by the force of its descent serving to take up the substances in the air or gas. In this respect my invention is distinguished from the ordinary gas washing or scrubbing apparatus referred to, as will be fully understood hereinafter. The means employed by me for effecting this result are capable of being constructed or embodied in a great many different ways, and likewise their appurtenances, but for all general purposes I have found that the construction and arrangement of devices herein shown give good results, and I prefer the same in practice, although it will be understood that I am not limited thereto in point of detail. Thus the separator is designated at 1, and this could in some instances comprise a simple hollow tank or vessel; but in order that the incoming air or gas be subjected to a more complete and effective impingement against the descending sheets of separating liquor I prefer to increase the interior superfices of the separator. Different means could be employed to this end, but as a simple and effective embodiment I provide the separator with a circuitous or practically a spiral passage 2, that is formed between the outer wall of the separator, and an inner or supplemental wall 3, which extends the full height of the separator, except for a short distance at the lower end thereof, where a space 3' is left all around, so that the liquor descending upon the inner surface of the outer wall will find passage to the outlet $3^2$ therefor in the bottom of the separator; also, in order that the water or other liquor descending upon the inner surface of the inner wall 3 may find its outlet through $3^2$, the lower end of the inner wall is left free or open. The said inner wall 3 may start from any suitable point within the separator and it may be bent or carried inward upon itself as many times as desired by which to increase the length of the passage 2, but preferably the same is made to terminate at or about the point 4, so as to leave a central vertical chamber 5, into which the gas or air passes from the passage through the communicating-opening 5'. Communicating with the said chamber 5 at the top is an exit-pipe 8', and the gases or air may be allowed to pass off through the same or else conducted off to some place for use. The lower end of the separator is provided with a conical bottom $8^2$ to facilitate the flow of the liquor thereto, and the passage 2 is closed at the top, as indicated at 9, so as to prevent escape of air or gas before the same has been made to pass the full length of the passage and fully subjected to the action of the descending sheets of separating liquor. Any suitable means could be provided for sending the liquor down the inner sides of the inner and outer walls in unbroken sheets, but as a simple construction I provide a single continuous pipe $a$, that is curved or bent in conformity with the shape or contour of the combined inner and outer walls in top plan and which pipe is closely perforated at $b$ all around the sides thereof adjacent the said walls, at or near the top of which latter the pipe is situated. At its inner extremity this perforated pipe is closed, while its outer end is connected with a pipe leading from the storage-tank and hereinafter referred to.

Entering the separator at the side is one end of a flue 10, that is made flaring vertically at 11, so as to conform to the full height of the passage 2, and this end of the said flue is in open communication with the said passage at the point where the latter begins. As a convenient construction I form the inner wall 3 as a practical continuation or extension of one side 12 of the enlarged inner end of the flue, substantially as is shown in Fig. 2, or the two may be separate and properly united or joined together air-tight. The said flue 10 is curved downward at 13 preferably, and is formed with a return-bend at 14, and outside of the flue and on opposite sides of the said return-bend thereof suitable supports 15 are provided for the bearings 16 of a shaft 17, that passes longitudinally through the bend 14 and carries a fan 18 for exhausting a room, chamber, or other place of its laden air or gas, which is thence passed to the separator to have recovered therefrom the soda-ash or other substances held by the same in suspension. By thus supporting the fan and its shaft all weight and strain of the same is taken from the flue, as is evident, and the flue itself may also with convenience be sustained by these supports through the medium of brackets 19, projecting from the inner sides thereof. The outer end of the fan is provided with a small band-pulley by which connection may be had with any suitable driving power. While the water or other liquor might be supplied to the separator in many different ways, it is desirable and absolutely essential that the same may be made to pass down the sides of the walls in continuous unbroken sheets, and after a charge of the liquor has been repeatedly passed through the separator a number of times its density will have so increased by the accumulation of the recovered soda-ash or other waste substance as to render it practically impossible for the same liquor to take up any more of the waste, whereupon the dense liquor which settles in the bottom of the tank is drawn off through the valved outlet-pipe $a^2$ without interrupting the operation.

As a convenient means for supplying the liquor to the spreading device $a$, I employ a storage-tank 20, having a partition 20', and by means of a pipe 21, having a valve $21^2$, I connect the tank to the bottom of the separator. Likewise at the opposite end of the tank at the bottom is a pipe 22, which leads to and connects with the casing of a small pump 23, from which leads a pipe or flue 24, that extends upward and across and is connected with the perforated liquid-spreader $a$ in the upper part of the separator. By reason of the location of the partition 20' a chamber $20^3$ is provided into which the liquid overflowing the partition 20' passes, and thus the action of the pump is to always draw the least dense and most effective liquid practically from the liquid-level of the tank. The said tank is provided with a float-valve 25 for maintaining the liquor in the tank and separator at a uniform level, and it is through the valve that fresh liquid is passed to the tank to replace the quantities drawn off at $a^2$ from time to time. Situated within the tank is a series of connected pipes 26, through which a heating or cooling medium may be carried to pass either to heat or to cool the liquor, according to the chemical nature of the substances separated.

By the construction and arrangement of parts above explained the air or gas will be delivered to the passage 2 with such force that it will be carried rapidly around the passage and will impinge against the sheets of liquor descending upon the surfaces of the two walls, and the waste substances will be carried down with the liquor and recovered, and the free gas or air will pass into the central chamber 5, from whence it rises up and passes out of the exit 8'.

The apparatus being thus constructed and arranged, the tank is supplied with a suitable quantity of water or other separating liquor and the valve $21^2$ opened, and then when the proper connection is made of the flue 10 with the source from which the air or gas is to be drawn the fan 18 and pump 23 are both started and the operation begins. As the laden gas or air is forced into the passage 2 of the separator, it impinges against the sheets of water descending down the sides of the outer and inner walls from the perforated pipes above, and by this means any soda-ash or other similar substance (capable of solution or mechanical detention in water or other liquor) held in suspension in the air or gas will be carried to the bottom of the separator and out through the pipe 21 to the tank. The water or other liquor is thus continuously made to pass from the tank to the separator and back again until it is completely utilized in the manner already explained.

Without limiting myself to the precise construction and arrangement of parts shown, I claim as my invention—

1. In apparatus for the purpose described, the combination of a separator closed at the top and bottom and provided with an exit-pipe, a flue conducting air or gas into the separator, a storage-tank for water or other liquor, and connections from the same to the upper and lower portions of the separator, and means for discharging a continuous unbroken sheet of the liquid upon the inner sides or surface of said separator, and for maintaining the liquid in circulation from one end of the separator to the other substantially as described.

2. In apparatus for the purpose described, the combination of a separator closed at the top and bottom, and provided with an exit-pipe at the top, a flue conducting the laden air or gas into the separator, and enlarged at its connecting end to the full height of said separator, a storage-tank for water or other liquor, means for producing a continuous circulation of such liquor between the tank and separator, and means for discharging the liquor in continuous unbroken sheets upon the inner surface of said separator, substantially as shown and for the purpose described.

3. In apparatus for the purpose described the combination of a closed separator, provided at its top with an exit-pipe and constructed on its interior with a circuitous passage extending the full height of the said separator, a flue conducting the laden air or gas to the said circuitous passage, a storage-tank for water or other liquor, means for producing a continuous circulation between such tank and separator and means for discharging the liquor in descending unbroken sheets upon the adjacent surfaces or walls of the said passage, substantially as described.

4. In apparatus for the purpose described, the combination of a separator provided at its top with an exit-pipe, and constructed interiorly with a supplementary wall forming a spiral chamber, a flue conducting the laden air or gas to the said passage, a storage-tank for water or other liquor, and means for discharging the liquor upon the adjacent surfaces of the passage in unbroken sheets, substantially as shown and described.

5. In apparatus for the purpose described, the combination of a separator, the storage-tank and connections, and the conducting-flue connecting with the separator and having a shaft passing through the same longitudinally and provided with a fan, independent outside supports and bearings for the ends of said shaft, and a pump for producing a circulation between the tank and separator, substantially as described.

6. In apparatus for the purpose described, the combination of the separator having an exit-pipe at the top, and constructed with an inner supplementary wall constituting a passage and a central chamber each being open at the bottom and leading to the discharge in the bottom of the separator, a conducting-flue for the laden air or gases, a tank for water or other liquor; and pipe connections between the bottom of the tank and the top and bottom of the separator, a pump for producing a circulation of such liquor between the tank and separator, and means for discharging the liquor down the sides of the passage in unbroken sheets, substantially as shown and described.

7. In apparatus for the purpose described, the closed separator having an exit-pipe at the top and provided with an inner vertical wall terminating a little short of the height of the separator at the bottom, and parallel with the walls of said separator, said walls forming a spiral passage and a central communicating chamber, the said separator being provided interiorly with devices adapted to discharge a stream of liquor down the sides of the passage in unbroken sheets, substantially as shown and set forth.

8. In an apparatus for the purpose described, the combination with a separator having curved walls and provided with an exit-pipe, of a flue entering the separator and adapted to deliver a blast of laden air tangentially to the walls of the separator-chamber, a circulating-pipe connecting the opposite ends of the separator, and a pump connected to said pipe whereby a continuous circulation of fluid from one end of the separator to the other is maintained, substantially as described.

9. In an apparatus for the purpose described, the combination with a separator having curved walls and provided with an exit-pipe, of a flue entering the separator and adapted to deliver a blast of laden air tangentially to the walls of the separator-chamber, a circulating-pipe connecting the opposite ends of the separator, and a pump connected to said pipe whereby a continuous circulation of fluid in an unbroken sheet from one end of the separator to the other is maintained in a direction transverse to that in which the laden air is delivered, substantially as described.

In testimony whereof I have signed my name to this specification in the presence of two subscribing witnesses.

ALEXANDER H. TWOMBLY.

Witnesses:
M. C. MARSTON,
MAY L. MITCHELL.